United States Patent
Janssen et al.

(10) Patent No.: US 10,611,881 B2
(45) Date of Patent: Apr. 7, 2020

(54) POLYAMIDE FIBERS

(71) Applicant: DSM IP ASSETS B.V., Heerlen (NL)

(72) Inventors: Pim Gerard Anton Janssen, Echt (NL); Alexander Antonius Marie Stroeks, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 15/109,694

(22) PCT Filed: Jan. 12, 2015

(86) PCT No.: PCT/EP2015/050421
§ 371 (c)(1),
(2) Date: Jul. 5, 2016

(87) PCT Pub. No.: WO2015/107024
PCT Pub. Date: Jul. 23, 2015

(65) Prior Publication Data
US 2016/0333144 A1 Nov. 17, 2016

(30) Foreign Application Priority Data

Jan. 17, 2014 (EP) .................................. 14151627

(51) Int. Cl.
| | | |
|---|---|---|
| C08G 69/26 | (2006.01) | |
| D01F 6/80 | (2006.01) | |
| D01F 6/90 | (2006.01) | |
| D01H 7/00 | (2006.01) | |

(52) U.S. Cl.
CPC ............ *C08G 69/26* (2013.01); *C08G 69/265* (2013.01); *D01F 6/80* (2013.01); *D01F 6/90* (2013.01); *D01H 7/00* (2013.01)

(58) Field of Classification Search
CPC ...... Y10T 428/2931; D01D 5/08; C08G 69/26
See application file for complete search history.

(56) References Cited

U.S. PATENT DOCUMENTS

| | | | | |
|---|---|---|---|---|
| 3,574,811 | A | * | 4/1971 | Jamison .................. D01D 5/12 264/184 |
| 5,075,168 | A | * | 12/1991 | Maruyama ............... D02G 3/00 428/364 |
| 6,747,120 | B2 | | 6/2004 | Rulkens et al. |
| 2007/0249783 | A1 | * | 10/2007 | Miyamoto ........... C08G 69/265 524/607 |
| 2009/0227760 | A1 | | 9/2009 | Warren et al. |
| 2010/0063245 | A1 | | 3/2010 | Rulkens |

FOREIGN PATENT DOCUMENTS

GB          1124840          *  9/1968

OTHER PUBLICATIONS

International Search Report for PCT/EP2015/050421, dated Mar. 26, 2015, 3 pages.

* cited by examiner

*Primary Examiner* — Gregory Listvoyb
(74) *Attorney, Agent, or Firm* — Nixon & Vanderhye P.C.

(57) ABSTRACT

The present invention relates to a polymer fiber made of a polyamide composition comprising a semi-crystalline semi-aromatic polyamide (PPA), wherein the PPA consists of repeat units derived from
  aromatic dicarboxylic acid comprising at least 80 mole % of terephthalic acid, relative to the total amount of aromatic dicarboxylic acid and
  diamine comprising at least 5 mole % of a first diamine and at least 5 mole % of a second diamine relative to the total amount of diamine; and
  0-5 mole % of other monomeric units, relative to the total amount of aromatic dicarboxylic acid, diamine and other monomeric units, wherein the PPA has a melting temperature (Tm) of at least 310° C. measured by the DSC method according to ISO-11357-1/3, 2011 and with a heating rate of 10° C./min.

11 Claims, No Drawings

POLYAMIDE FIBERS

This application is the U.S. national phase of International Application No. PCT/EP2015/050421 filed 12 Jan. 2015 which designated the U.S. and claims priority to EP Patent Application No. 14151627.8 filed 17 Jan. 2014, the entire contents of each of which are hereby incorporated by reference.

The present invention relates to polyamide fibers, and to yarns comprising said polyamide fibers. Further, the present invention relates to a process for preparing such polyamide fibers.

The field of the invention is that of polymer fibers, more particular polymer fibers that have good mechanical and thermal properties and can be used in demanding applications such as high temperature rubber reinforcement fiber (such as turbo hose reinforcement fiber), thermoplastic reinforcement fiber, stitching yarns, sewing thread, filter yarns, textile yarns, monofilament (for instance for high temperature resistant brushes), fishing lines, plastic composite reinforcement fiber, rubber reinforced mechanical goods, single end cords, tire reinforcement, high temperature resistant clothing, and chemical resistant yarns.

For low-end products, polymer fibers are made of polyesters, polyamide 6 or polyamide 66 and for high-end products, polymer fibers are made of aramides processed by solution spinning and PEEK, PPS and polyimides processed via melt spinning. Advantages of these high-end materials are that they have very good mechanical properties, high thermal resistance, good hydrolysis resistance and good chemical resistance. However, these materials are expensive and difficult to process.

Polyamides, in particular aliphatic polyamides, are easily processed into fibers, and polyamide fibers are widely used for various purposes and in many applications. Aliphatic polyamides have a too low melting temperature, below 300° C., but semi-aromatic polyamides can have melting temperatures well above 300° C. Mechanical properties of polyamide fibers can be improved by orientation and stretching the fibers around or above the glass transition temperature. Polyamide fibers, also stretched polyamide fibers, however, suffer from the fact that the mechanical properties above the glass transition temperature (and in particular at elevated temperatures as high as it may be needed) are much lower than the mechanical properties below the glass transition temperature. The inventors have observed that uniaxially stretched polyamide fibers of semi-aromatic polyamides with a melting temperature above 300° C., for example PA9T or PAXT/Y6, have a much lower stiffness at 260° C.

Another aspect is that polyamide fibers used as part of a monofilament, a multifilament, a textile fiber or a yarn are produced on large scale involve polyamides with relative low melting temperatures. High melting polyamides with a melting temperature above 310° C. tend to produce fibers comprising bubbles, in particular when the fibers are produced by melt process in a fiber production unit with a single-screw extruder. Such bubbles complicate the stretching process, as the bubbles can initiate rupture of the fibers during stretching.

A first aim of the present invention is to provide a polymer fiber made of a polyamide composition that has improved mechanical properties at elevated temperature, which production process is bubble free and which fiber has a good appearance.

A second aim is to provide a process for preparing a polymer fiber having such improved mechanical properties.

A further aim is to provide a polyamide fiber that can be produced on a single-screw extruder with less bubbles, and which can be used for the production of the polymer fiber with the said improved mechanical properties.

In a first aspect of the invention the polymer fiber is a stretched polymer fiber made of a polyamide composition comprising a semi-crystalline semi-aromatic polyamide (PPA), wherein the PPA consists of repeat units derived from
  aromatic dicarboxylic acid comprising at least 80 mole % of terephthalic acid, relative to the total amount of aromatic dicarboxylic acid; and
  diamine comprising at least 5 mole % of a first diamine and at least 5 mole % of a second diamine relative to the total amount of diamine; and
  0-5 mole % of other monomeric units, relative to the total amount of aromatic dicarboxylic acid, diamine and other monomeric units,
wherein the PPA has a melting temperature (Tm) of at least 310° C. measured by the DSC method according to ISO-11357-1/3, 2011 with a heating rate of 10° C./min.

In a second aspect of the invention the polymer fiber is produced by a process wherein the composition comprising the said semi-crystalline semi-aromatic polyamide is subjected to a) melting the polyamide composition as defined in the present invention, b) spinning the melted polyamide composition to obtain a polymer fiber, c) cooling the spun melted polymer fiber, and stretching the fiber. Stretching of the polymer fiber to produce the stretched polymer fiber is typically done at a temperature (T-stretch) below Tm.

In a third aspect of the invention, the stretched polymer fiber according to the present invention can be in the form of monofilaments, as well as in the form of multifilaments and as yarns comprising the stretched polymer fiber according to the present invention. In the context of the present invention, a monofilament is to be understood as a wire consisting of a single strand of fiber. In the context of the present invention, a multifilament is a wire comprising more than one strand of fiber. In the context of the present invention, a yarn is to be understood as is a continuous length of interlocked fibers. In the context of the present invention, ply of yarns, woven or non-woven yarn and fabrics made thereof such as dipped fabrics can comprise, or even consist of, the polymer fiber according to the present invention.

The effect of the stretched polymer fiber according to the invention is that the fiber shows very good mechanical properties, in particular above the glass transition temperature and much better than that of other semi-crystalline semi-aromatic polyamides based on terephthalic acid, or based on a combination of terephthalic acid and adipic acid.

According to one embodiment of the present invention, the polymer fiber can be produced by a process wherein the polyamide composition comprising said semi-crystalline semi-aromatic polyamide is subjected to steps a) to d) as described above including a stretching step d). The polyamide composition has a glass transition temperature (Tg) and a melting temperature (Tm). The thus obtained fiber is stretched at a temperature (T-stretch) below Tm and optionally subjected to a heat setting step at a temperature between T-stretch and Tm. Preferably, the stretching step is carried out at a temperature between the glass transition temperature of the polyamide composition (Tg) and the melting temperature of the polyamide composition (Tm). Such a process comprising steps a) to c) and the stretching step as recited above, is used to prepare monofilaments (for instance for high temperature resistant brushes), or technical yarns to be used in applications such as rubber reinforcement fiber (such as turbo hose reinforcement fiber), thermoplastic reinforcement fiber, filter yarns, fishing lines, plastic composite reinforcement fibers. In the process for making such monofilaments or yarns, the fiber is spun from the melt and during spinning form the melt the fiber is cooled rather fast to prevent crystallization development as much as possible. In a monofilament process the fiber is typically cooled in a water bath; for a technical yarn process the fiber is cooled by exposition to a side air stream. The fiber spinning from the melt is characterized by rather low spinning speeds. For the process for the preparation of a monofilament, the spinning velocity is in the range from 2 m/min to 30 m/min, preferably from 6 m/min to 10 m/min, more preferably about 8 m/min. In the process for preparing a technical yarn, the spinning velocity is in the range from 200 m/min to 2000 m/min, preferably from 400 m/min to 800 m/min, more preferably about 600 m/min. After cooling from the melt the level of molecular orientation in the fiber is low. Furthermore, the level of crystallinity is also low. Downstream the process, the fiber can be uniaxially stretched at temperatures typically between the glass transition temperature (Tg) and the melting temperature (Tm) of the polymer fiber. This stretching can be performed in a multistep fashion with typically increasing stretching temperatures for each stretching step in the temperature range between Tg and Tm. Crystallization development typically occurs already during these stretching steps and may hinder further stretchability. Therefore in the process according to the present invention, the stretching temperature sequence is such, that it is minimized the crystallization of the polymer. After stretching, the fiber is given an additional heat set step just below Tm with the fiber under mechanically constrained conditions or under conditions where the fiber can shrink a small fraction in length direction. It is during this step that a high level of crystallization is achieved.

The stretching can be performed in a single or in a multiple stretching step method. In a multiple stretching step method a first stretching is suitably done at a temperature T-stretch-1 around Tg of the polyamide composition, preferably within a range from (Tg−20° C.) to (Tg+20° C.). A second stretching step is performed at a temperature T-stretch-2 that is in the range from T-stretch-1+20° C. up to T-stretch-1+100° C. but below Tm. An eventual third stretching step is performed at a temperature T-stretch-3 in the range from T-stretch-2+20° C. up to T-stretch-2+100° C. but below Tm. In a single stretching step, the stretching is performed at a temperature between Tg and Tm, more preferably at a temperature between Tg and Tg+60° C., still more preferably at a temperature between Tg and Tg+40° C. After the stretching step(s), the fiber is suitably subjected to a heat-setting step. Herein the fiber is heated under full mechanical constrained conditions or allowing some geometrical relaxation at a temperature between the temperature of the last stretching step and Tm. Preferably this temperature is in the range between Tm−30° C. and Tm, more preferably at a temperature between Tm−15° C. and Tm, and subsequently the fiber is cooled to below Tg. The duration of the heat-setting step is suitably in the range between 0.5 and 30 seconds, for example between 5 and 20 seconds. The fiber may be kept at the heat setting temperature for a duration longer than 30 seconds; however, this does not bring further significant improvement. The advantage of heat setting is that the physical properties and dimensions of the fiber are better retained when heated again to a temperature above the Tg of the polyamide composition.

The stretching ratio of the fiber may be varied over a wide range, and it has been observed that the stretching ratio for unidirectionally stretched fiber can be as high as 3.5 and beyond, up to around 6. Suitably, the unidirectionally stretched fiber has undergone a stretching step with a stretching ratio of at least 1.5. Preferably the stretching ratio is at least 2, more preferably at least 2.5 or even at least 3.0.

The effect of the stretching is that the fiber becomes oriented and anisotropic in its properties, with specific properties, such as mechanical strength being enhanced in the uniaxial stretching direction. Suitably, the polymer fiber according to the invention has anisotropic properties such as thermal expansion which decrease in the stretching direction or birefringence.

In a particular embodiment of the stretched polymer fiber according to the invention, the polymer fiber has a tensile strength (TS) of at least 300 MPa, Preferably, TS is at least 400 MPa, more preferably at least 500 MPa, and may be as high as 650 MPa, or even higher In another particular embodiment of the stretched polymer fiber according to the invention, the polymer fiber has a tensile modulus (TM) at 1% elongation of at least 3.0 GPa. Preferably, TM is at least 4.0 GPa, more preferably at least 5.0 GPa, and may be as high as 6.5 GPa, or even higher. Preferably, the polymer fiber has both a tensile strength of at least 300 MPa and a tensile modulus at 1% elongation of at least 3.0 GPa. Herein, both the tensile strength and the tensile modulus are measured by the method according to ASTM D885M at 23° C. and 50% relative humidity.

A second embodiment of the process according to the present invention provides a method of preparation for textile fibers. This type of process is fundamentally different from the first embodiment in that the molecular orientation of the fiber is realized in the production step related to the spinning from the melt: for the high speed spinning process, the spinning velocity therefore for this class of processes is much higher compared to the previous class and is in the range from 3000 m/min to 15000 m/min, preferably from 4000 m/min to 6000 m/min, more preferably about 5000 m/min. Under these conditions a neck is formed in the melt leading to a local high level of orientation triggering the crystallization process. Optionally additional stretching can be performed in a single or in a multiple stretching step method at the temperature range between Tg and Tm as recited above. One (or more) exposition to downstream heat set step after the process according to steps a) to c) can be carried out.

The polymer fiber according to the invention may have a diameter varying over a broad range, depending on the field of application. The diameter of the fiber is measured experimentally by optical microscopy. The diameter may be as high as 1000 μm (micrometer) or even higher, while still having good high temperature properties. The thickness may be as low as 0.5 μm or lower. Below 0.5 μm the stretching and handling is very difficult and is often leading to fiber rupture. Preferably the diameter is in the range from 1 μm to 1000 μm. The more preferred thickness is in the range from 5 μm to 500 μm, or even from 10 to 500 μm, or still more preferred from 20 to 400 μm.

The polymer fiber according to the present invention is made of a polyamide composition comprising a semi-crystalline semi-aromatic polyamide, which is denoted herein as PPA. The PPA used in the polymer fiber according to the invention consists of repeat units derived from aromatic dicarboxylic acid comprising at least 80 mole % of terephthalic acid, relative to the total amount of aromatic dicarboxylic acid; and diamine comprising at least 5 mole % of a first diamine and at least 5 mole % of a second diamine, relative to the total amount of diamine, wherein the combined amount of first diamine and at least second diamine can be at least 60 mole % relative to the total amount of diamine, 0-5 mole % of other monomeric units, relative to the total amount of aromatic dicarboxylic acid, diamine and other monomeric units.

With the polymer fiber comprising the polyamide composition according to the present invention, the first diamine and/or the second diamine can be any linear aliphatic diamines.or any branched aliphatic diamines, or any cycloaliphatic diamines. Advantageously, the first and/or second diamine can be selected from the group consisting of 1,2-ethanediamine, 1,3 propanediamine, 1,4-butanediamine, 1,5-pentanediamine, 1,6-hexanediamine, 1,8-octanediamine, 1,9-nonanediamine or 1,10-decanediamine, 1,12-dodecanediamine, 2-methyl 1,5-pentane diamine, and 1,4-cyclohexanediamine. Good results have been obtained when the first diamine is 1,4-butanediamine. Good results have been obtained when the first diamine is 1,6-hexanediamine. Preferably the first diamine is 1,4-butanediamine or 1,6-hexanediamine. More preferably both 1,4-butanediamine and 1,6-hexanediamine are present and the combined amount of 1,4-butanediamine and 1,6-hexanediamine is at least 60 mole % relative to the total amount of diamine.

Aromatic dicarboxylic acids that can be used next to terephthalic acid include isophthalic acid, naphthalene dicarboxylic acid, and/or diphenylene dicarboxylic acid. Preferably, the aromatic dicarboxylic acid comprises at least 90 mole % of terephthalic acid, and eventually fully consists of terephthalic acid. Advantageously, the aromatic dicarboxylic acids comprise at most 20 mole % of isophthalic acid, or more preferably at most 15 mole % of isophthalic acid. The presence of an additional aromatic carboxylic acid is beneficial for reducing the melting temperature, the crystallization rate and improves the stretchability, as well as to obtain an easily processable product.

To lower the melting temperature of the PPA, a (further) diamine may be added next to the first and second diamine in an amount of at most 40 mole %, relative to the total amount of diamine. Preferably the amount is in the range of 0-40 mole %, preferably 0-30 mole %, for example 5-25 mole %. The presence of a third diamine with the at least first diamine and second diamine is as well beneficial for reducing the crystallization and improving the stretching, as well as to obtain an easily processable product.

Examples of suitable further (third) diamines are linear aliphatic diamines such as 1,2-ethanediamine, 1,3 propanediamine, 1,5-pentanediamine, 1,8-octanediamine, 1,9-nonanediamine, 1,10-decanediamine, 1,12-dodecanediamine or branched aliphatic diamines such as 2-methyl 1,5-pentane diamine, or cycloaliphatic diamines such as 1,4-cyclohexanediamine, preferably in combination with either 1,4-butanediamine or 1,6-hexanediamine, or in combination with both 1,4-butanediamine and 1,6-hexanediamine. Advantageously, 1,10-decanediamine is the third diamine.

Preferably, the PPA has a melting temperature (Tm) of at least 310° C. (degrees Celsius), more preferably of at least 315° C., most preferably at least 320° C. The melting temperature Tm of the PPA can for instance be between 320° C. and 360° C.

With the melting temperature is herein understood the temperature, measured by the DSC method according to ISO-11357-1/3, 2011, on pre-dried samples in a nitrogen atmosphere with heating and cooling rate of 10° C./min.

Herein Tm is calculated from the peak value of the highest melting peak in the second heating cycle.

With the glass transition temperature (Tg) is herein understood the temperature, measured by the DSC method according to ISO-11357-1/2, 2011, on pre-dried samples in a nitrogen atmosphere with heating and cooling rate of 10° C./min. Herein Tg is calculated from the value at the peak of the first derivative (with respect of time) of the parent thermal curve corresponding with the inflection point of the parent thermal curve in the second heating cycle.

The PPA may comprise 0-5 mole %, preferably 0-2 mole % of monomeric units other than those derived from aromatic dicarboxylic acid and diamine. These may include one or more components selected from aliphatic dicarboxylic acids, amino-functional carboxylic acids, mono-functional components such as mono-functional amines and mono-functional carboxylic acids, poly-functional compounds, i.e. with three or more functional groups, such as tri-functional amines and tri-functional carboxylic acids. The aliphatic dicarboxylic acid can for instance be adipic acid and/or sebacic acid. The amino-functional carboxylic acids can for instance consist of ε-aminocaproic acid, 11-amino-1-undecanoic acids and/or 12-amino-1-dodecanoic acid or their respective lactams caprolactam, undecane-11-lactam and laurolactam. Mono-functional amine can be, for instance, stearylamine, dodecylamine and/or decylamine. Mono-functional carboxylic acids can for instance consist of stearic acid, benzoic acid, acetic acid and/or propanoic acid. An example of a tri-functional amine is for instance bis(hexamethylene)triamine. Trimesic acid can for instance be used for the tri-functional carboxylic acid.

The total amount of such other monomeric units is limited to 5 mole %, preferably to 3 mole %, more preferably to 2 mole % relative to the total amount of aromatic dicarboxylic acid, diamine and other monomeric units (the total amount of the components of the PPA).

Preferably, the PPA comprises less than 0.20 mole % of poly-functional monomeric units relative to the total amount of aromatic dicarboxylic acid, diamine and other monomeric units. With a higher amount of poly-functional monomeric units the PPA is less good processable.

In a preferred embodiment, the PPA in the polyamide composition has a relative viscosity (RV) of at least 1.75. Herein, the relative viscosity (RV) is measured in sulphuric acid, concentration 1 gram in 100 ml 96% sulfuric acid at 25° C., by the method according to ISO 307, fourth edition. The advantage is that during the fiber preparation on a single screw extruder the occurrence of bubble formation is reduced. More preferably, the relative viscosity (RV) of at least 1.90.

An example of a PPA that can be used in the process and fiber according to the invention is PA 6T/4T, i.e. is a copolyamide consisting of 1,6-hexanediamine, 1,4-butanediamine and terepthalic acid wherein no other diamines or other aromatic dicarboxylic acids are used. Such semi-aromatic polyamides are known from U.S. Pat. No. 6,747,120. A problem of polyamide 6T/4T is that under standard processing conditions it is difficult to prepare such a polyamide with sufficiently high molecular weight and sufficiently high viscosity. Though it is mentioned in U.S. Pat. No. 6,747,120 that higher molecular weights, and thereby higher viscosities, may be achieved by using acid or amine monomers with functionalities of 3 and higher, the use of such monomers also introduces the risk of crosslinking and gelation of the polyamide during polymerization and/or during melt processing. The viscosity of PA 6T/4T polymers mentioned in U.S. Pat. No. 6,747,120 is in the range of 1.35-1.58. In connection with the present invention it is noted here that polyamides like PA 6T/4T and copolymers comprising other diamines corresponding with the present invention with sufficiently high molecular weight corresponding with an RV of 1.75 or higher can be prepared by direct solid-state polymerization without the risk of gelation.

A polymer having a RV of 1.75 or higher is advantageously used for making the polymer fiber according to the present invention.

The polyamide composition used for the polymer fiber according to the invention comprises the PPA described above. The said fiber and composition may comprise one or more further components. However, the PPA is suitably present in an amount of at least 60 wt. %, preferably at least 70 wt. %, more preferably 80-100 wt. %, relative to the total weight of the composition. The composition may comprise, for example, other polyamides, however, the amount thereof is suitably limited, for example, other semi-crystalline semi-aromatic polyamide in an amount of at most at most 40 wt. %, and preferably 0-25 wt. %; amorphous semi-aromatic polyamide in an amount of at most 40%, and preferably 0-25 wt. %, and/or semi-crystalline aliphatic polyamide in an amount of at most 5 wt. %, and preferably 0-2.5 wt. %, relative to the total weight of the composition. The combined amount thereof shall be limited to at most 40 wt. %, preferably at most 30 wt. % and still more preferably 0-20 wt. %. Examples of other semi-crystalline semi-aromatic polyamide are PA 8T, PA 9T, PA 10T or copolymers thereof such as PA 6T, PA10T/6T. A suitable amorphous semi-aromatic polyamide is PA6I/6T.

Advantageously, the polyamide composition has a glass transition temperature of at least 100° C., more advantageously at least 120° C., most advantageously at least 130° C. Advantageously, the polyamide composition has a melting temperature of at least 310° C., more advantageously at least 315° C. Good results have been obtained when the polyamide composition had a Tm of at least 315° C. and a Tg of at least 120° C.

The polyamide composition may also comprise additional thermoplastic polymers other than polyamide, for instance polyphenylene sulfide (PPS), liquid crystal polymer (LCP), aramid resin, polyether ether ketone (PEEK), polyether imide (PEI), polyimide (PI) and optionally a compatibilizing agent. Preferably, the amount of additional thermoplastic polymer is at most 20 wt. %, and preferably 0-10 wt. %, even more preferably 0-5 wt. %, relative to the total weight of the composition. In the context of the present invention, the polyamide composition and the polymer fiber made thereof may comprise one or more components selected from other polymers, fibrous reinforcing materials, nanoparticles, inorganic fillers, flame retardants, and auxiliary additives, such stabilizers, impact modifiers, colorants, pigments, plasticizers, and process aids like nucleating agents, anti-blocking agents, mold release agents and anti-slip agents. Such further components are suitably chosen such that the mechanical properties at elevated temperature are not deteriorated in significant extent. Auxiliary additives are suitably present in a combined total amount of at most 10 wt. %, preferably 0-5 wt. %, and most suitably 0-2.5 wt. %.

Whereas the fiber according to the invention may comprise different other components next to the PPA, such other components are preferably present in a total amount of, for example at most 20 weight percent (wt. %), preferably at most 10 wt. % or even better at most 5 wt. %, relative to the total weight of the polymer composition, and suitably chosen such that the mechanical properties at elevated temperature are not deteriorated in significant extent. Accordingly, the PPA is preferably present in an amount of at least 80 wt. %, more preferably 90 wt. %, still more preferably at least 95 wt. %, relative to the total weight of the polymer composition.

The present invention also relates to a polymer fiber made of a polyamide composition comprising a semi-crystalline semi-aromatic polyamide (PPA), with a composition as in the polymer fiber and having a relative viscosity RV of 1.75 or higher. The PPA suitably has a melting temperature (Tm), of at least 315° C. and a relative viscosity (RV) of at least 1.75. Also suitably, the PPA is present in an amount of at least 60 weight percentage (wt. %), relative to the total weight of the polymer composition.

The invention also relates to the use of a polymer fiber according to the invention or obtainable by the process according to the invention, or any specific or preferred embodiment thereof relating to application of such polymer fibers, such as rubber reinforcement fibers (such as turbo hose reinforcement fiber), thermoplastic reinforcement fibers, stitching yarns, sewing thread, filter yarns, textile yarns, monofilament (for instance for high temperature resistant brushes), fishing lines, plastic composite reinforcement fibers.

The invention is further illustrated with the following examples and comparative experiments.

EXAMPLES

Materials

M1 PA 6T/4T (30 mole % 1,6-hexanediamine, 20 mole % 1,4-butanediamine and 50 mole % terephthalic acid), RV 2.1, Tg 151° C. and Tm 338° C.

M2 PPA based on 42.5 mole % terephthalic acid and 7.5 mole % adipic acid, 30 mole % 1,6-hexanediamine and 20 mole % 1,4-butanediamine, RV 2.3, Tg 125° C. and Tm 325° C.

M3 PPA based on 42.5 mole % terephthalic acid and 7.5 mole % adipic acid, 30 mole % 1,6-hexanediamine and 20 mole % 1,4-butanediamine, RV 1.9, Tg 125° C. and Tm 325° C.

M4 Novamid X21 F07 PA 6I/6T (50 mole % 1,6-hexanediamine, 35 mole % isophthalic acid and 15 mole % terephthalic acid) semi aromatic amorphous copolyamide, Tg 127° C., ex DSM.

B1 80:20 wt. % blend of M1 PA 6T/4T and M4 PA 6I/6T. RV 2.2, Tg 145° C. and Tm 324° C.

Fiber Processing

The fibers were produced by a fiber process that is representative for the first class of fiber processes as described before. All materials were dried prior to processing. A Collin single screw extruder (screw diameter 30 mm, L/D=30) was connected to a feed block with a slot die with a rectangular die-lip. In this die-lip a rectangular metal block was positioned containing a multitude of circular openings with a typical diameter of 1 mm. A typical melting and transport screw is applied; rotation speed is 100 rpm. The feeding rate of polyamide and forming of the melt was such that the residence time of the polymer melt in the melt extrusion zones, feed block and die was about 2-3 minutes. A melt filter with grid opening 25 micrometer was applied. The molten fibers are taken up by and quenched on a chill role with a temperature of 20° C. to prevent crystallization development as much as possible. The takeoff speed of the chill role is 40 m/min resulting in a fiber diameter of approximately 350 micrometer and a draw down ratio in the order of a factor 10. The fibers were collected on bobbins and directly stored in alumina bags to shield from moisture.

In a second step these fibers were exposed to a uniaxial stretching process. For this stretching process again precautions were taken to shield the fiber from moisture from the atmosphere. The stretching process occurred by leading the fibers over two stretching units; each stretching unit was composed of 5 metal roles with a diameter of 72 mm each. The fibers were transferred over the first stretching unit with a speed of 3.0 m/min; the speed of the 2nd stretching unit was varied. The length of the stretching zone is 190 mm. In the series of experiments as described in the table below, the last two roles of the first stretching device were heated to the temperature as given in the table (T draw). Under the given conditions, the contact time with the heated roles is in the order of a few seconds. The speed of the $2^{nd}$ stretching unit is gradually increased starting with a speed of 3.0 m/min (draw ratio equal 1) to a speed where rupture of the fiber occurs reflecting a certain breaking maximum draw ratio. The draw ratio was decreased by a value of 0.1 and the fiber is collected. The corresponding draw ratio is denoted as the maximum draw ratio at which drawn fiber can be produced.

Tensile Properties of Fibers

Tensile strength (or strength), tensile modulus (or modulus) and elongation at break (EAB) are defined and determined on multifilament yarns as specified in ASTM D885M, using a nominal gauge length of the fibre of 500 mm, a crosshead speed of 50%/min and Instron 2714 clamps, of type 'Fibre Grip D5618C'. The tensile properties were measured at 23° C. and 50% relative humidity. The yarns were preconditioned at 23° C. and 50% relative humidity for 60 minutes prior to the tensile test. On the basis of the measured stress-strain curve the modulus and strength, the tensile forces divided by the titre; values in MPa or GPa are calculated assuming a density of 1.2 g/cm3. Filament denier is determined by weighing 1 m of filament on a microbalance. For each sample 5 filaments were tested.

DMA Measurements

The dynamic mechanical analyses on the fibers were carried out in accordance with ASTM D5026 using a TA RSA-III test system at a frequency of 1 Hz and at a heating rate of 5° C./min under dry conditions. During the measurements, the storage modulus (E') was determined as a function of temperature. The fibers were clamped in the device. Typical initial distance between clamps is 25 mm.

Example 1 (E-1)

A fiber was produced from M1 according to the melt spinning process as described before and with temperature settings of the barrels of the extruder, feedblock and die-lip as mentioned in the following table. Transparent good quality fibers with a uniform diameter were obtained. Fibers are collected on a bobbin and exposed to an uniaxial stretching step as described before. The stretching temperature is given in the next table together with the level of stretching of a factor of 3.0 for this particular sample. The obtained fiber has the same Tm and Tg as M1.

Example 2 (E-2)

A fiber was produced from M1 according to the melt spinning process as described before and with temperature settings of the barrels of the extruder, feedblock and die-lip as mentioned in the following table. Fibers are collected on a bobbin and exposed to a second uniaxial stretching step as described before. The stretching temperature is given in the next table together with the level of stretching of a factor of 3.0 for this particular sample. Furthermore, a blend was studied of M1 with M4 in the composition 80 wt % M1/20 wt % M4. As can be seen from the next table, this leads to an increase of the maximum draw ratio to 3.3 compared to a pure M1 system. The obtained fiber has the same Tm and Tg as B1.

Comparative Examples 1-3 (CE-1, CE-2, CE-3)

Fiber were also produced from M2 and M3 according to the melt spinning process as described before and with temperature settings of the barrels of the extruder, feedblock and die-lip as mentioned in the following table. The obtained fibers were transparent indicating sufficient quenching, however the appearance of these fibers was not good. The diameter was heterogeneous and bubbles were present in the fiber. Fibers are collected on a bobbin and exposed to an uniaxial stretching step as described before. The stretching temperature is given in the next table together with the level of stretching of a factor of 1.5 for CE-1 and 1.3 for CE-2. When optimizing the stretching step in CE-1 by applying higher temperature, the stretching ratio becomes even less as seen for CE-3. The stretching ratio of CE-1, CE-2 and CE-3 is clearly lower than for E-1 and E-2. The obtained fibers of CE-1, CE-2 and CE-3 have a Tm of 325° C. and Tg of 125° C.

TABLE 1

|  | E-1 | E-2 | CE-1 | CE-2 | CE-3 |
|---|---|---|---|---|---|
| Material | M1 | B1 80/20 wt %/wt % | M2 | M3 | M2 |
| Tm polyamide composition | 338 | 324 | 325 | 325 | 325 |
| Tg polyamide composition | 151 | 145 | 125 | 125 | 125 |
| T extruder (° C.) | 340 | 340 | 325 | 325 | 325 |
| T feedblock (° C.) | 340 | 340 | 325 | 325 | 325 |
| T die-lip (° C.) | 350 | 350 | 335 | 335 | 335 |
| Stretch ratio max at Tstretch-1 | 3.0 | 3.3 | 1.5 | 1.3 | 1.3 |
| T stretch-1 (° C.) | 155 | 155 | 130 | 130 | 155 |
| Diameter (μm) | 350 ± 20 | 350 ± 20 | 350 ± 150 | 350 ± 150 | 350 ± 150 |
| Transparent | Yes | Yes | Yes | Yes | Yes |
| Bubbles in fiber production process | No | No | Yes | Yes | Yes |

The tensile properties of the unstretched multifilament yarn (E-2a) and the stretched multifilament yarn (E-2b) of E-2 show that stretching is needed to have a strong fiber with a high modulus, see Table 2. Stretched multifilament yarn CE-1b and CE-2b, for which a maximum stretch ratio of only 1.5 and 1.3 respectively could be reached, showed significantly lower strength and modulus compared to E-2b.

TABLE 2

|  | E-1a | E-1b | E-2a | E-2b | CE-1b | CE-2b |
|---|---|---|---|---|---|---|
| Material | M1 | M1 | B1 80/20 wt %/wt % | | M2 | M3 |
| Stretch ratio | 1.0 | 3.0 | 1.0 | 3.3 | 1.5 | 1.3 |
| EAB (%) | 120 | 8.2 | 296 | 9.1 | 79 | 95 |
| Strength (MPa) | 60 | 520 | 117 | 510 | 240 | 182 |
| Modulus at 1% elongation (GPa) | 0.8 | 5.6 | 0.51 | 5.7 | 2.2 | 1.8 |

The effect of the stretched polymer fiber according to the invention is that the fiber shows very good mechanical properties, in particular above the glass transition temperature and much better than that of other semi-crystalline semi-aromatic polyamides based on terephthalic acid, or based on a combination of terephthalic acid and adipic acid.

Stretched fibers E-1b and E-2b with a stretch ratio of 3.0 and 3.3 respectively show significantly higher moduli above Tg compared to stretched fiber CE-1b which only had a maximum stretch ratio of 1.5, as shown by tests results collected in Table 3.

TABLE 3

Tensile storage modulus (GPa) for fibers of E-2b and CE-1b at different temperatures

|  | E-1b | E-2b | CE-1b |
|---|---|---|---|
| Material | M1 | B1 80/20 wt %/wt % | M2 |
| Stretch ratio | 3.0 | 3.3 | 1.5 |
| 23° C. | 4.7 | 5.6 | 2.1 |
| 200° C. | 1.6 | 0.6 | 0.2 |
| 250° C. | 1.1 | 0.4 | 0.1 |

The invention claimed is:

1. A polymer fiber made of a polyamide composition comprising:
   at least 80 wt. %, based on total weight of the polyamide composition, of a semi-crystalline semi-aromatic polyamide (PPA), and
   0-5 wt. %, based on the total weight of the polyamide composition, of a semi-crystalline aliphatic polyamide, wherein
   the PPA consists of repeat units derived from monomers comprising:
   (a) an aromatic dicarboxylic acid comprising at least 80 mole % of terephthalic acid, relative to the total amount of aromatic dicarboxylic acid;
   (b) a diamine mixture comprising at least 5 mole % of a first diamine, and at least 5 mole % of a second diamine relative to the total amount of diamine; and
   (c) 0-2 mole % of other monomeric units, relative to the total amount of aromatic dicarboxylic acid, diamine and other monomeric units, wherein
   the PPA has a melting temperature (Tm) of at least 310° C. measured by a DSC method according to ISO-11357-1/3, 2011 with a heating rate of 10° C./min, and wherein
   the polymer fiber is a stretched polymer fiber which is stretched at a stretch temperature (T-stretch) below Tm, and wherein
   the stretched polymer fiber has a tensile strength of at least 300 MPa, or a tensile modulus at 1% elongation of at least 3.0 GPa, or both, wherein the tensile strength and the tensile modulus are measured by the method according to ASTM D885M at 23° C. and 50% relative humidity.

2. The polymer fiber according to claim 1, wherein the first diamine is 1,4-butanediamine.

3. The polymer fiber according to claim 1, wherein the second diamine is 1,6-hexanediamine.

4. The polymer fiber according to claim 1, wherein the first and second diamine are present in a combined amount of at least 60 mole % relative to the total amount of diamine.

5. The polymer fiber according to claim 1, wherein the aromatic dicarboxylic acid comprises at most 20 mole % of isophthalic acid.

6. The polymer fiber according to claim 1, wherein the diamine mixture comprise at least one diamine selected from the group consisting of 1,2-ethanediamine, 1,3-propanediamine, 1,5-pentanediamine, 1,8-octanediamine, 1,9-nonanediamine, 1,10-decanediamine, 1,12-dodecanediamine and branched aliphatic diamines.

7. The polymer fiber according to claim 1, wherein the polymer fiber has a melting temperature (Tm) of at least 315° C. measured by the DSC method according to ISO-11357-1/3, 2011 with a heating rate of 10° C./min and a glass transition temperature (Tg) of at least 120° C. measured by the DSC method according to ISO-11357-1/2, 2011 with a heating rate of 10° C./min.

8. The polymer fiber according to claim 1, wherein the PPA has a relative viscosity (RV) of at least 1.75, wherein the RV is measured in sulphuric acid, concentration 1 gram in 100 ml 96% sulfuric acid at 25° C., by the method according to ISO 307, fourth edition.

9. The polymer fiber according to claim 1, wherein the PPA comprises less than 0.20 mole % of poly-functional monomeric units, relative to the total amount of aromatic dicarboxylic acid, diamine and other monomeric units.

10. The polymer fiber according to claim 1, wherein the polymer fiber was stretched by a stretch ratio of at least 2.

11. A yarn consisting of the polymer fiber according to claim 1.

* * * * *